(12) United States Patent
Nguyen et al.

(10) Patent No.: US 10,161,529 B2
(45) Date of Patent: Dec. 25, 2018

(54) GASKET SEAL FOR A GATE VALVE

(71) Applicant: Emerson Vulcan Holding LLC, St. Louis, MO (US)

(72) Inventors: Viet Nguyen, Reno, NV (US); Peter Woodhead, Brisbane (AU); Kenneth Nguyen, Reno, NV (US); Christopher Don Nyhammer, Reno, NV (US)

(73) Assignee: Emerson Vulcan Holding LLC, St. Louis, MO (US)

( * ) Notice: Subject to any disclaimer, the term of this patent is extended or adjusted under 35 U.S.C. 154(b) by 65 days.

(21) Appl. No.: 15/132,850

(22) Filed: Apr. 19, 2016

(65) Prior Publication Data

US 2017/0299067 A1    Oct. 19, 2017

(51) Int. Cl.
  *F16K 3/02*   (2006.01)
  *F16J 15/06*  (2006.01)

(52) U.S. Cl.
  CPC ........... *F16K 3/0227* (2013.01); *F16J 15/06* (2013.01); *F16K 3/0281* (2013.01)

(58) Field of Classification Search
  CPC .............................. F16K 3/0227; F16K 3/316
  USPC ........................................................ 251/326
  See application file for complete search history.

(56) References Cited

U.S. PATENT DOCUMENTS

| | | | |
|---|---|---|---|
| 4,377,274 A | 3/1983 | Mayhew, Jr. | |
| 4,679,770 A * | 7/1987 | Liberman | F16K 3/0281 |
| | | | 251/328 |
| 4,703,915 A | 11/1987 | King | |
| 5,979,874 A | 11/1999 | Gambetta et al. | |
| 6,959,912 B2 | 11/2005 | Reeves et al. | |
| 7,059,586 B2 | 6/2006 | Vanderberg et al. | |
| 7,350,766 B2 | 4/2008 | Comstock et al. | |
| 7,815,170 B2 * | 10/2010 | Devine, Jr. | F16K 3/0227 |
| | | | 251/326 |
| 2005/0103688 A1 * | 5/2005 | McHenry | B03C 1/145 |
| | | | 209/223.2 |
| 2005/0145818 A1 * | 7/2005 | Santiago | F16J 15/46 |
| | | | 251/327 |
| 2006/0255305 A1 * | 11/2006 | Comstock | F16K 3/0227 |
| | | | 251/328 |

(Continued)

FOREIGN PATENT DOCUMENTS

| | | | | |
|---|---|---|---|---|
| DE | 10112642 A1 * | 9/2002 | | F16K 3/0227 |
| GB | 2340916 A * | 3/2000 | | F16K 3/0227 |

(Continued)

*Primary Examiner* — Marina Tietjen
(74) *Attorney, Agent, or Firm* — Quarles & Brady LLP

(57) ABSTRACT

Embodiments provide a gate valve including a first body half that defines a first process fluid aperture, a first chest portion, and a first gate support recess that is formed in the first chest portion. A second body half defines a second process fluid aperture that is aligned with the first process fluid aperture, a second chest portion, and a second gate support recess that is formed in the second chest portion. A gate is movable relative to the first body half and the second body half, and a gasket seal includes a flange portion, a body portion, and at least one cutout. The flange portion and the body portion are sized to be compressed between the first body half and the second body half, and the at least one cutout provides for volume transformation of the gasket seal under compression.

19 Claims, 18 Drawing Sheets

(56) References Cited

U.S. PATENT DOCUMENTS

| | | | | |
|---|---|---|---|---|
| 2009/0121173 A1* | 5/2009 | Devine, Jr. | ............ | F16K 3/0227 251/328 |
| 2010/0224815 A1* | 9/2010 | Sidler | ................... | F16K 3/0227 251/326 |
| 2016/0076657 A1* | 3/2016 | Watterodt | ............. | F16K 3/0227 251/328 |

FOREIGN PATENT DOCUMENTS

| WO | 2002095273 A1 | 11/2002 |
|---|---|---|
| WO | 2010068583 A1 | 6/2010 |

* cited by examiner

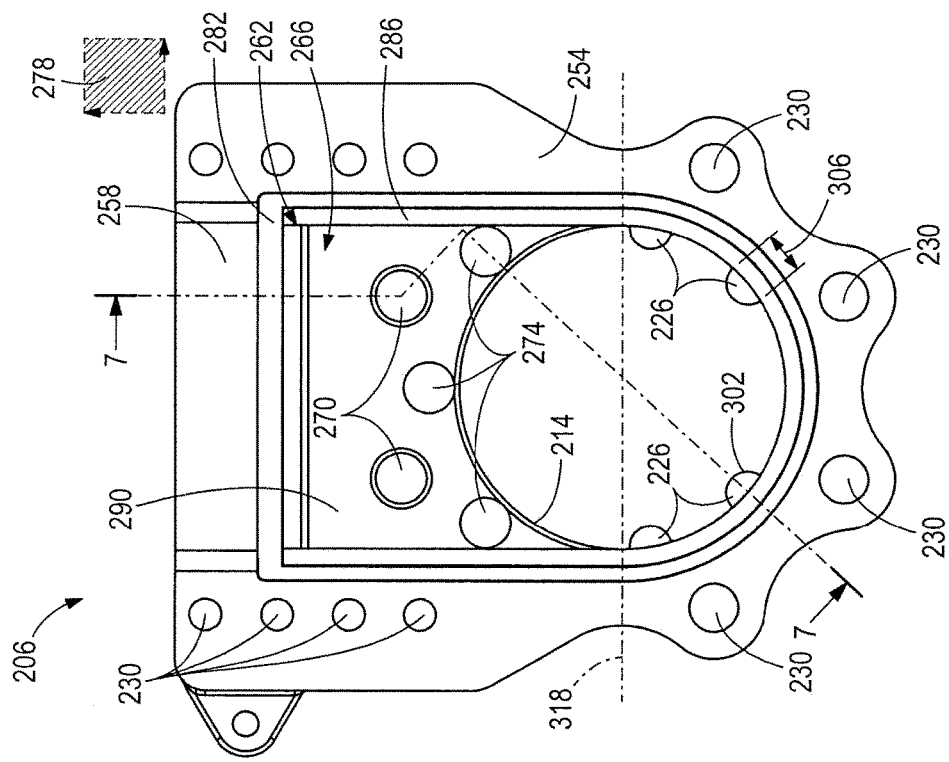
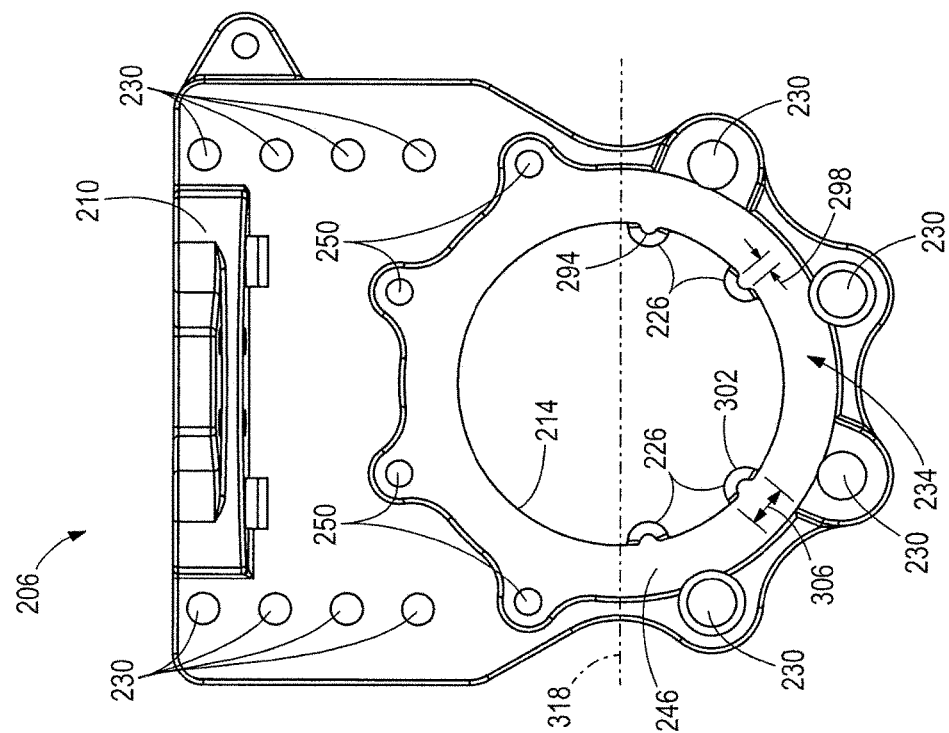

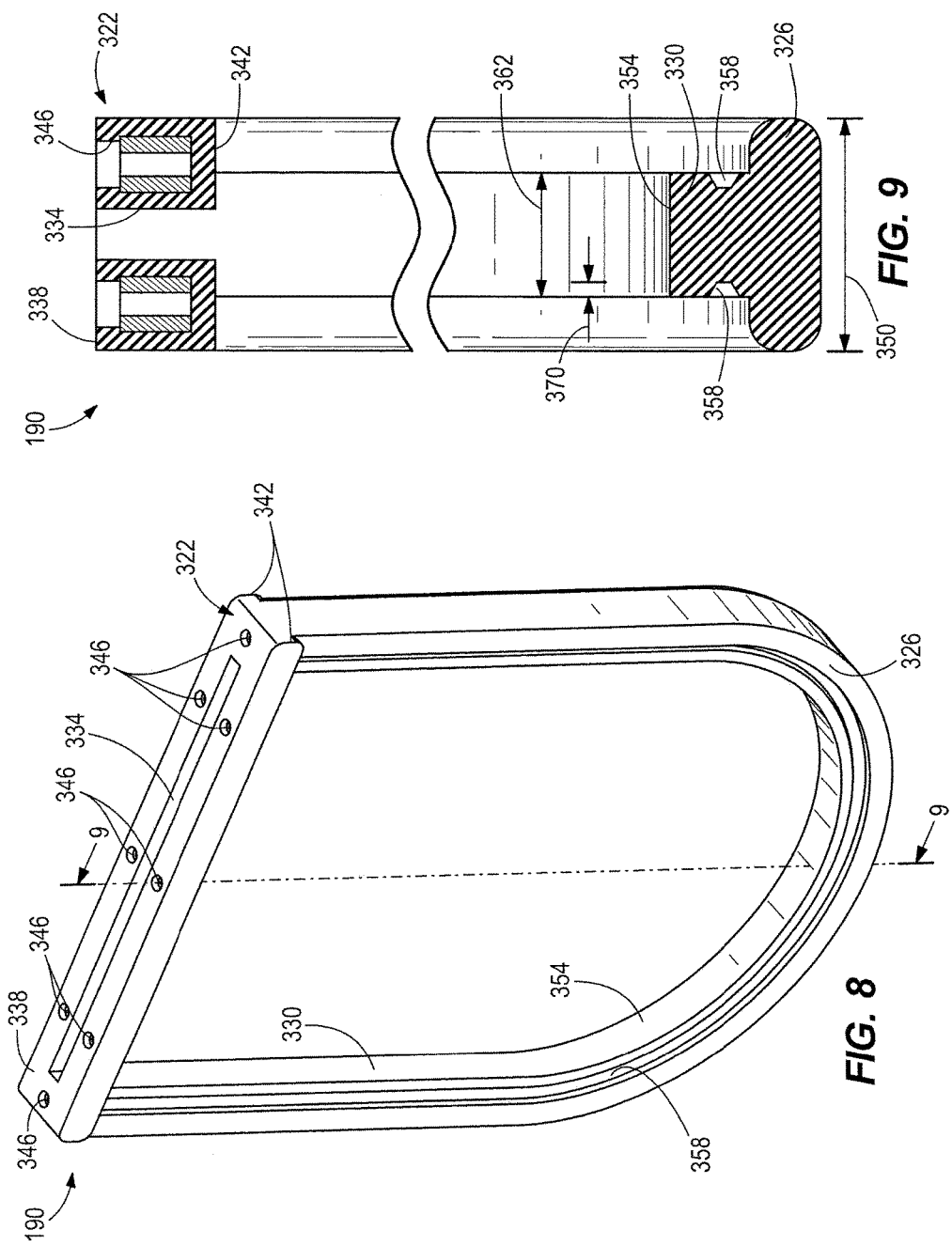

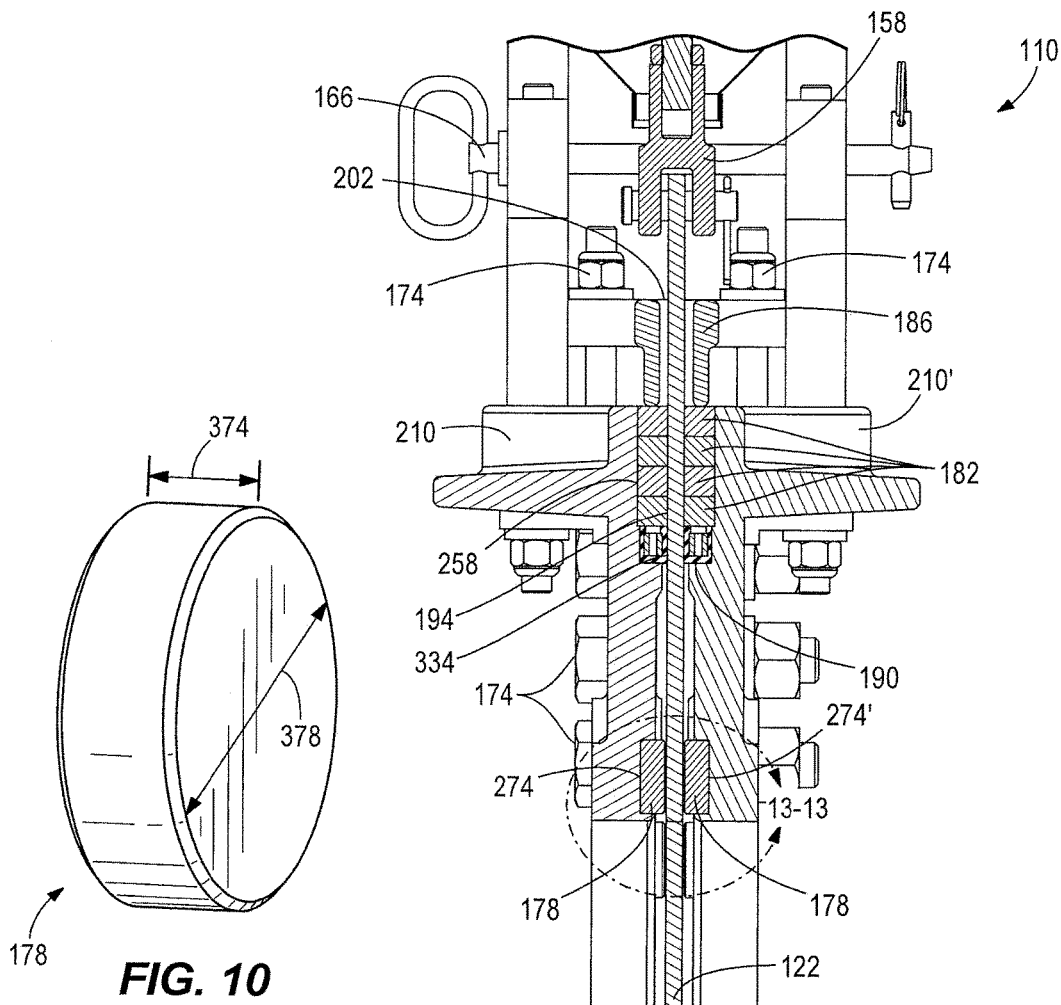
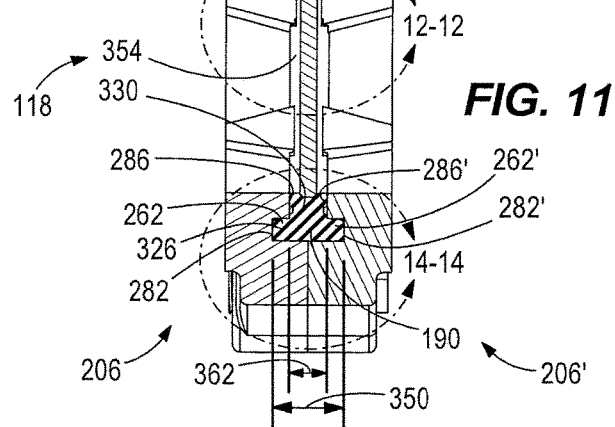
FIG. 10
FIG. 11

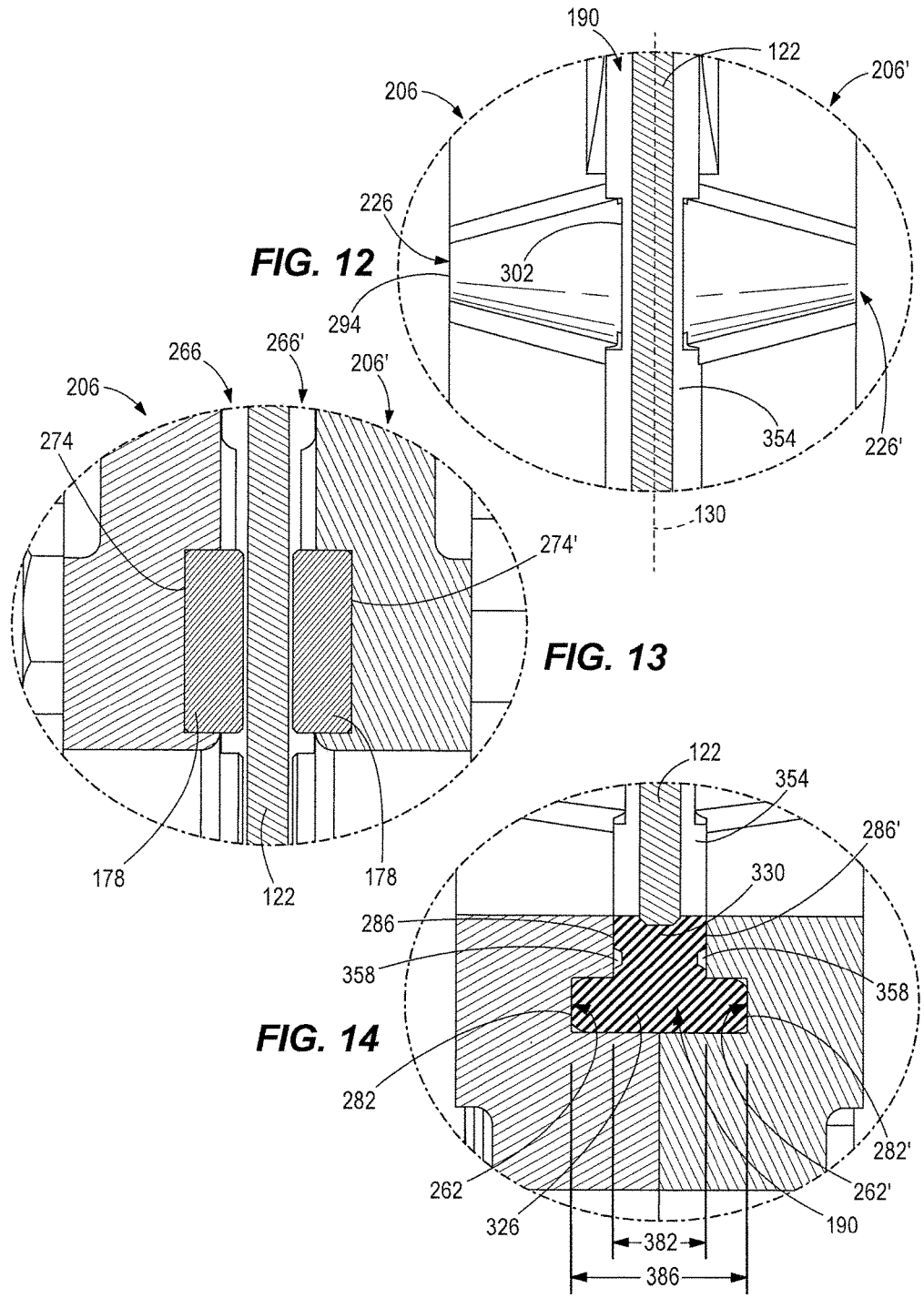

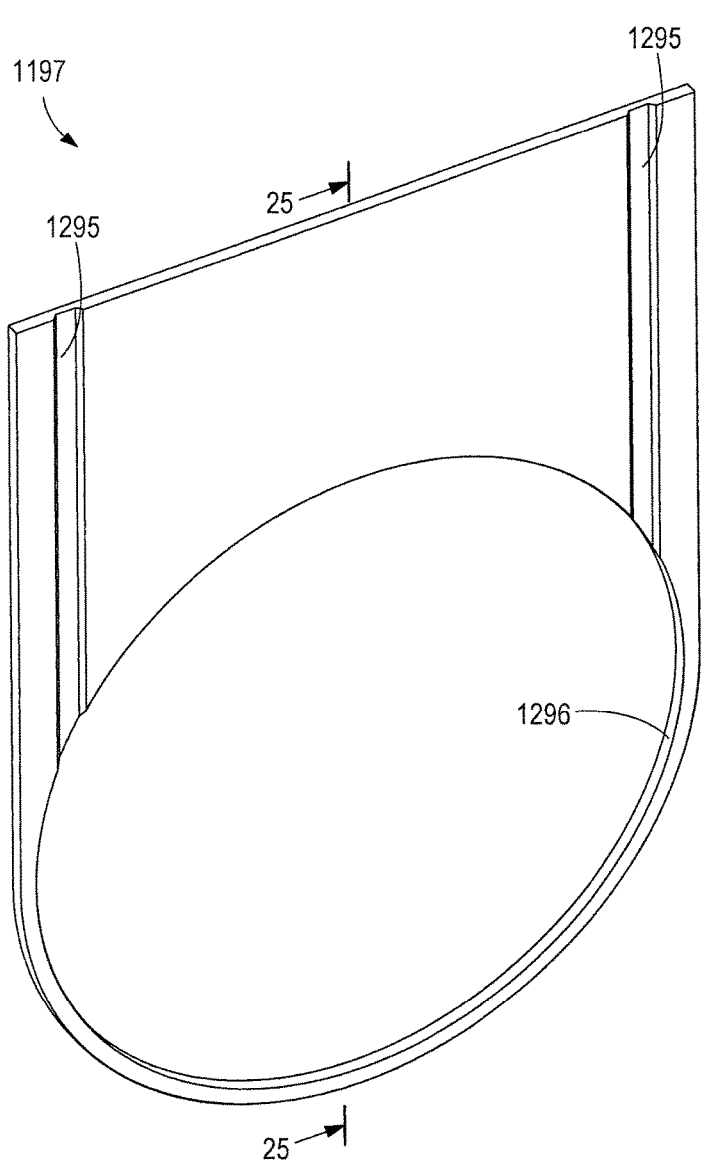
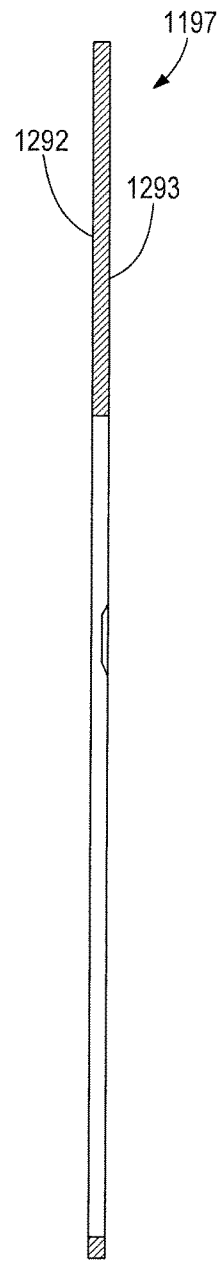
FIG. 24
FIG. 25

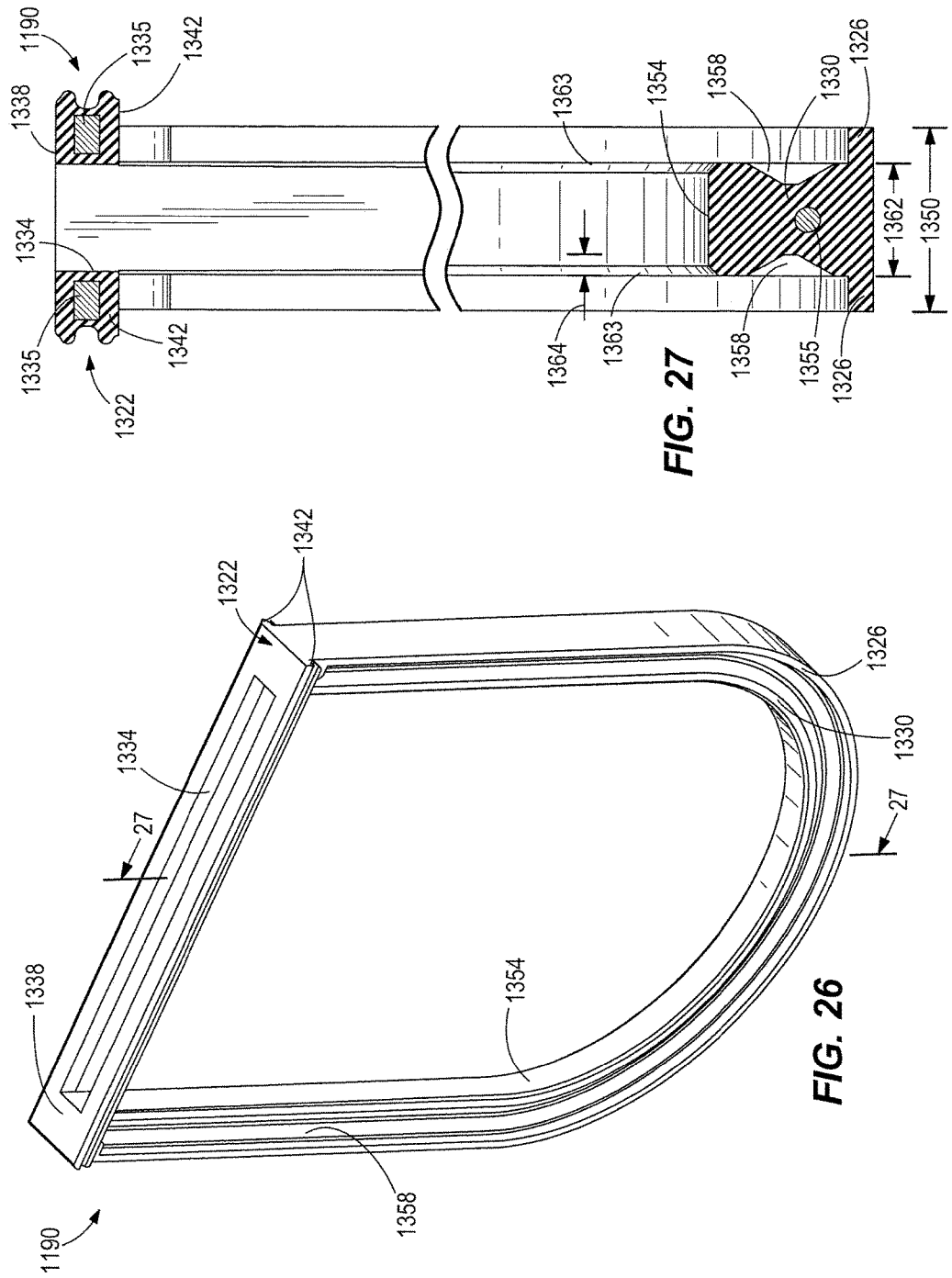

GASKET SEAL FOR A GATE VALVE

BACKGROUND

Gate valves are typically used for fluid flow control in pipeline systems. Typical gate valves include a housing, a seal, and a gate that moves between an open position and a closed position to control a flow of process fluid through the gate valve.

Gate valves tend to experience deflection when arranged in the closed position or a partially closed position. This deflection can increase the wear experienced by the seal and other components of the gate valve.

Additionally, typical gasket-type seals have a tendency to wear out over time and lose their sealing capability when the gate valve is in the closed position.

BRIEF SUMMARY OF THE INVENTION

Some embodiments of the invention provide a gate valve includes a first body half that defines a first process fluid aperture, a first chest portion, and a first gate support recess that is formed in the first chest portion. A second body half defines a second process fluid aperture that is aligned with the first process fluid aperture, a second chest portion, and a second gate support recess that is formed in the second chest portion. A gate is movable relative to the first body half and the second body half, and a gasket seal includes a flange portion, a body portion, and at least one cutout. The flange portion and the body portion are sized to be compressed between the first body half and the second body half, and the at least one cutout provides for volume transformation of the gasket seal under compression.

Other embodiments of the invention provide a sealing assembly for a gate valve. The sealing assembly includes a primary seal recess that is formed in the body of the gate valve and includes a primary flange width and a primary body width. A gasket seal includes a body portion that defines a body portion width larger than the primary body width. A flange portion defines a flange portion width that is larger than the primary flange width. A cutout is arranged to provide volume transformation under compression.

Other embodiments of the invention provide a seal for a gate valve that includes a body portion that defines a body portion width, a flange portion that defines a flange portion width, and a cutout that is arranged to provide volume transformation under compression.

BRIEF DESCRIPTION OF DRAWINGS

FIG. 5 is an elevational front view of the first body half of FIG. 3.

FIG. 6 is an elevational back view of the first body half of FIG. 3.

FIG. 8 is a top front perspective view of a gasket seal of the gate valve of FIG. 1.

FIG. 9 is a sectional view of the gasket seal of FIG. 8 taken along the line 9-9 of FIG. 8.

FIG. 10 is a top perspective view of a circular gate support of the gate valve of FIG. 1.

FIG. 11 is a sectional view of the gate valve of FIG. 1 taken along the line 11-11 of FIG. 1.

FIG. 12 is a detail view of the gate valve of FIG. 1 taken within the line 12-12 of FIG. 11.

FIG. 13 is a detail view of the gate valve of FIG. 1 taken within the line 13-13 of FIG. 11.

FIG. 14 is a detail view of the gate valve of FIG. 1 taken within the line 14-14 of FIG. 11.

FIG. 24 is a perspective view of a sealing ring of the gate valve of FIG. 16.

FIG. 25 is a sectional view of the sealing ring of FIG. 24 taken along line 25-25 of FIG. 24.

FIG. 26 is a perspective view of a gasket seal of the gate valve of FIG. 16.

FIG. 27 a sectional view of the gasket seal of FIG. 26 taken along the line 27-27 of FIG. 26.

DETAILED DESCRIPTION OF THE INVENTION

Figure 1:
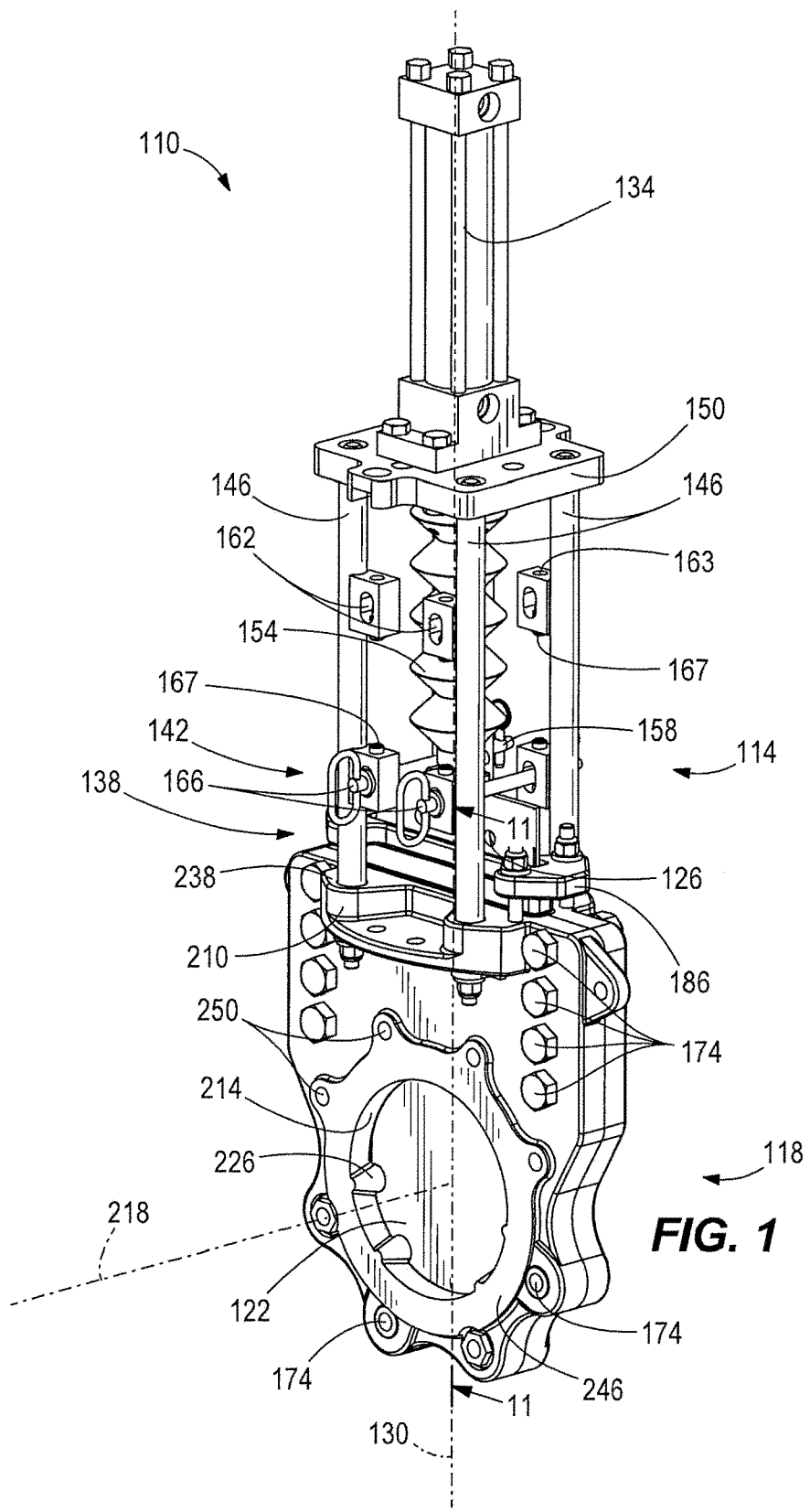
FIG. 1 is a perspective view of a gate valve according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

FIG. 1 shows a gate valve 110 according to one embodiment. The gate valve 110 includes an actuation system 114, a valve body assembly 118, and a gate 122. The gate 122 includes gate locking apertures 126 and defines a gate axis 130. The actuation system 114 includes an actuator 134 in communication with a control system (not shown), an actuator mount 138 that couples the actuation system 114 to the valve body assembly 118, and a lockout system 142. In one embodiment, the actuator 134 is a linear hydraulic actuator. In other embodiments, the actuator 134 can be an electronic actuator, a pneumatic actuator, a hand wheel and a threaded rod, or a lever. The actuator mount 138 includes fastening rods 146, an actuator coupling plate 150, a coupler shaft 154, and a gate coupling 158 for joining the coupler shaft 154 and the gate 122. The lockout system 142 includes actuator mount lockout apertures 162 and lockout keys 166. The actuator mount lockout apertures 162 each include a jacking bolt aperture 163. In the illustrated embodiment, there are two lockout keys 166. In other embodiments, there could be more or less than two lockout keys 166. In the illustrated embodiment, there are eight actuator mount lockout apertures 162. In other embodiments, there could be more or less than eight actuator mount lockout apertures 162.

Figure 2:
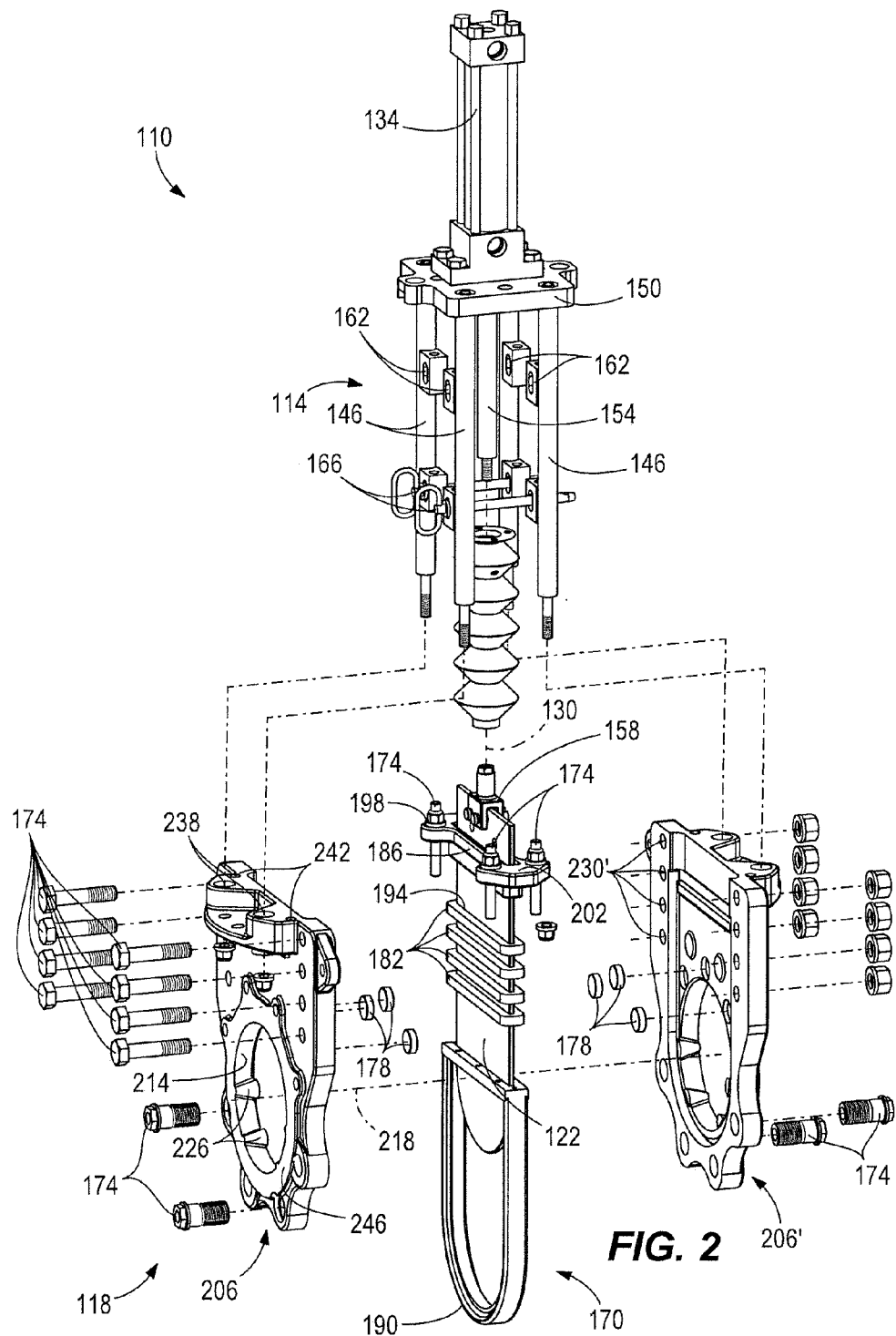
FIG. 2 is an exploded perspective view of the gate valve of FIG. 1.

FIG. 2 shows an exploded view of the gate valve 110 including the actuation system 114, the valve body assembly 118, a sealing system 170, fastening elements 174, and chest gate supports 178. The sealing system 170 includes the gate 122, the gate coupling 158, packing material 182, a packing gland 186, and a primary seal 190. In the illustrated embodiment, there are four layers of packing material 182. In other embodiments there could be more or less than four layers of packing material 182. Each of the layers of packing material 182 includes a packing material aperture 194. The packing gland 186 includes packing gland fastening apertures 198 and a packing gland gate aperture 202.

The valve body assembly 118 includes a first body half 206 and a second body half 206'. The first and second body halves 206, 206' are symmetric, and the following description of the first body half 206 also applies to the second body half 206', with like parts on the second body half 206' numbered in the prime series. The second body half 206' can include different features that are not discussed herein. For example, in some embodiments, the second body half 206' can include mounting features that are different from the first body half 206 to enable each half to properly fit into the desired piping system.

Figure 3:
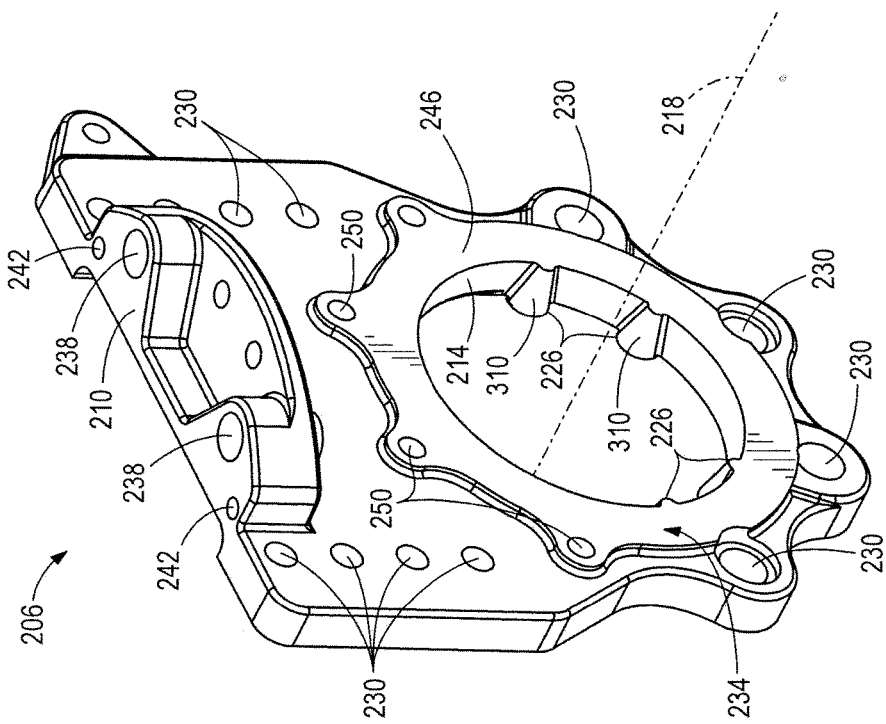
FIG. 3 is a top front perspective view of a first body half of the gate valve of FIG. 1.

As shown in FIG. 3, the first body half 206 includes an actuator mounting flange 210, a first process fluid aperture 214 defining a first process fluid flow axis 218, port gate supports 226, body mounting apertures 230 arranged both parallel to the first process fluid flow axis 218 and radially around the first process fluid aperture 214, and a plumbing flange 234. The actuator mounting flange 210 includes actuator mounting apertures 238, and packing mount flange apertures 242. The plumbing flange 234 defines a plumbing flange surface 246, which includes flange apertures 250 arranged radially around the plumbing flange surface 246, enabling the first body half 206 to couple to a pipe (not shown) through which the process fluid flows.

Figure 4:
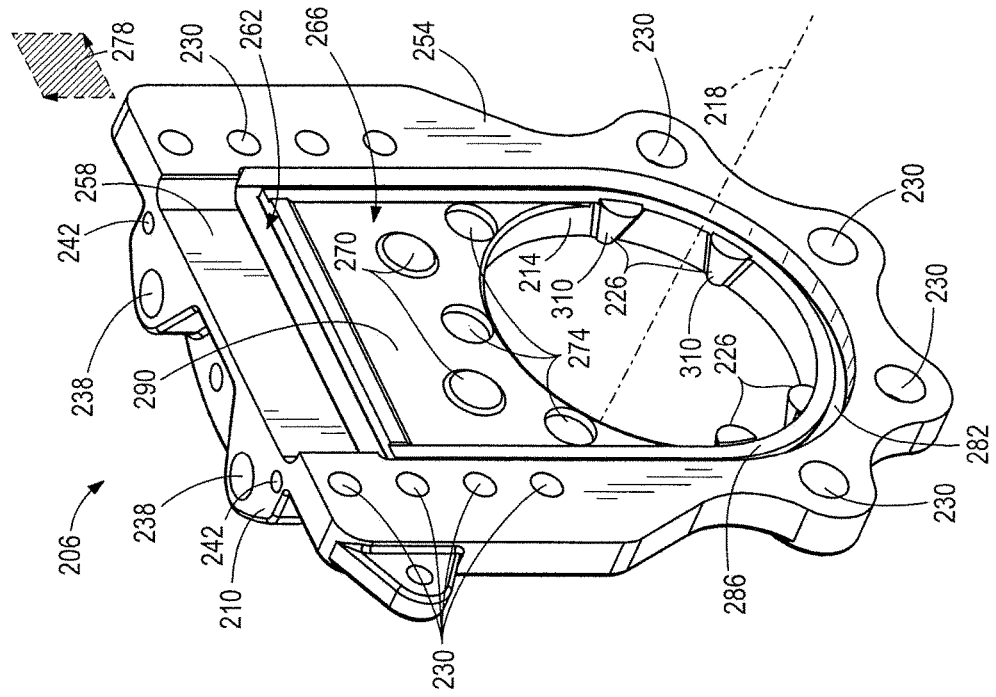
FIG. 4 is a top back perspective view of the first body half of FIG. 3.

As shown in FIG. 4, the first body half 206 further includes a non-recessed portion or body mating surface 254, a packing recess 258, a primary seal recess 262, a chest portion 266, two chest projections 270, and chest gate support recesses 274 arranged in the chest portion 266 radially around the first process fluid flow aperture 214. The body mating surface 254 of the first body half defines a center plane 278. The packing recess 258 is recessed into the first body half 206 extending away from the center plane 278. The primary seal recess 262 is recessed into the first body half 206 extending away from the center plane 278 and includes a primary flange recess 282 and a primary body recess 286. The chest portion 266 is bound by the first process fluid aperture 214 and the primary seal recess 262, and defines a chest plane 290.

The two chest projections 270 protrude from the chest plane 290 towards the center plane 278 and provide structural support to the flange apertures 250. The chest gate support recesses 274 are recessed into the first body half 206 from the chest plane 290 extending away from the center plane 278, and define a circular profile with a gate support diameter. The chest gate support recesses 274 could define other shaped profiles. In the illustrated embodiment, there are three gate support recesses 274. In other embodiments there could be more or less than three gate support recesses 274.

As shown in FIG. 5, one embodiment of the first body half 206 includes four port gate supports 226. In other embodiments, there could be more or less than four port gate supports 226. Each port gate support 226 defines an outer profile 294 that is semicircular and defines an outer diameter 298, and an inner profile 302 that is semicircular and defines an inner diameter 306. Each port gate support 226 also defines a cross sectional profile perpendicular to the first process fluid flow axis 218 that changes from the inner profile 302 to the outer profile 294. The area of the cross sectional profile increases exponentially from the inner profile 302 to the outer profile 294, so that the cross sectional profile remains substantially semicircular. An outer surface 310 of each port gate support 226 connects the inner profile 302 to the outer profile 294 linearly so that the outer shape is generally frustoconical.

Figure 7:
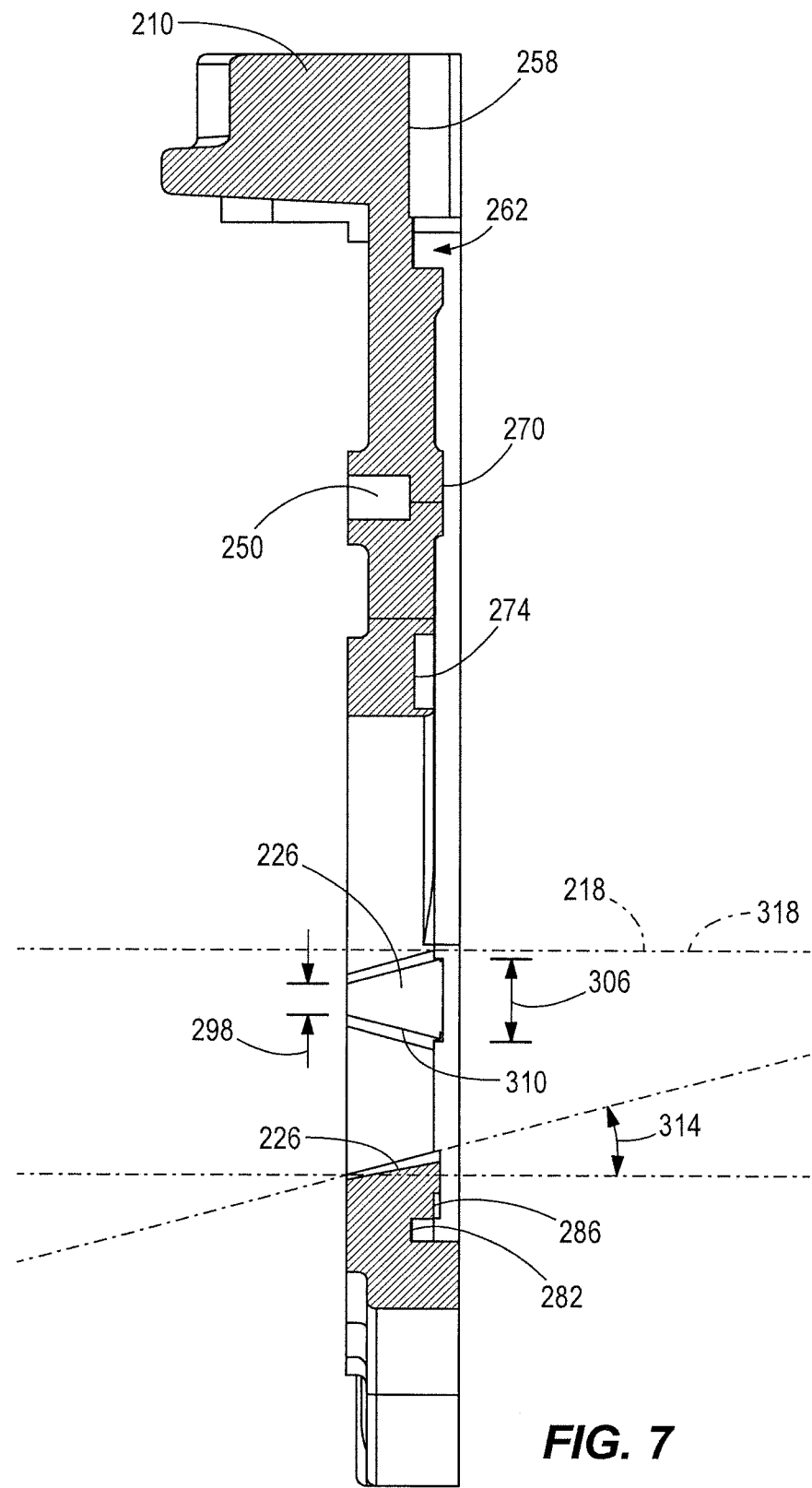
FIG. 7 is a sectional view of the first body half of FIG. 3 taken along the line 7-7 of FIG. 6.

As shown in FIG. 7, a port gate support angle 314 is defined between the first process fluid flow axis 218 and the outer surface 310 of each port gate support 226. According to one embodiment, the port gate support angle 314 is approximately fifteen degrees. In other embodiments, the port gate support angle 314 could be between ten and twenty five degrees. As shown in FIG. 4, each port gate support 226 overhangs into the first process fluid aperture 214. According to one embodiment, as shown in FIG. 7, all the port gate supports 226 are arranged below a halfway height 318 of the first process fluid aperture 214. In other embodiments, the port gate supports 226 could be arranged above or below the halfway height 318 of the process fluid aperture.

As shown in FIG. 8, the primary seal 190 includes an upper gland portion 322, a primary flange portion 326, and a primary body portion 330. The upper gland portion 322 includes an upper gate aperture 334, an upper surface 338, an upper flange portion 342, and upper surface apertures 346. In one embodiment, the upper gate aperture 334 defines a substantially rectangular shape to conform to the geometry of the gate 122. In other embodiments, the upper gate aperture 334 can define another shape to conform to another geometry of a different gate.

As shown in FIG. 9, the primary flange portion 326 includes rounded edges and defines a primary flange width 350. The primary body portion 330 includes a gate sealing surface 354, cutouts 358, and defines a primary body width 362. The gate sealing surface 354 is configured to receive the gate 122. Each cutout 358 defines a substantially trapezoidal shape and a cutout depth 370. As shown in FIG. 8, each cutout 358 extends around the primary seal 190. The cutout depth 370 is approximately thirteen percent of the primary body width 362. In other embodiments, the cutout depth 370 could be between five and twenty percent of the primary body width 362. The cutouts 358 are designed into the profile of the primary seal 190 in order to allow the seal material to flow or transform when primary seal 190 is compressed during assembly. In one embodiment, the cutout 358 defines a substantially trapezoidal shape. In other embodiments, the cutout 358 can define a square or rectangular shape, a triangular shape, or an arcuate shape. During compression the primary seal 190 undergoes a volume transformation wherein the volume remains the same, but is oriented differently.

As shown in FIG. 10, the chest gate supports 178 are configured to be received within the chest gate support recesses 274. According to one embodiment, the chest gate supports 178 have a circular profile and are generally cylindrical. The chest gate supports 178 define a chest gate support depth 374 and a chest gate support diameter 378, where the chest gate support depth 374 is approximately thirty-three percent of the chest gate support diameter 378. In one embodiment, the chest gate supports 178 have chamfered edges. In other embodiments, the chest gate supports 178 can have rounded or square edges. The chest gate supports 178 are fabricated from a material that has a high resistance to corrosion, and a low coefficient of friction.

FIG. 11 illustrates an assembled gate valve 110. The primary seal 190 is installed onto the first body half 206 by inserting the primary seal 190 into the primary seal recess 262 so that the primary flange portion 326 is inserted into the primary flange recess 282 and the primary body portion 330 is inserted into the primary body recess 286. The chest gate supports 178 are installed into the first body half 206 by inserting the chest gate supports 178 into the chest gate support recesses 274.

The chest gate supports 178 are then inserted into the second body half 206', and the second body half 206' is engaged with the first body half 206 so that the primary seal 190 is received within the primary seal recess 262' of the second body half 206'. Once the primary seal 190 is seated, the fastening elements 174 are installed through the body mounting apertures 230, 230' as shown in FIG. 2, and tightened to join the first body half 206 and the second body half 206'.

As also shown in FIG. 11, the packing material 182 are placed into the packing recesses 258, 258', and are then compressed into the packing recesses 258, 258' by the packing gland 186. As shown in FIG. 2, once the packing gland 186 is installed onto the valve body assembly 118, the fastening elements 174 are inserted through the packing gland fastening apertures 198 and into the corresponding packing gland flange apertures 242, 242' on the actuator mounting flanges 210, 210' and are then tightened to further compress the packing material 182 into the packing recesses 258, 258'.

The gate 122 is then inserted into the aligning packing gland gate aperture 202, packing material apertures 194, and upper gate aperture 334 of the primary seal 190. The gate 122 is moveable between a first or open position where the gate 122 does not block any of the first process fluid aperture 214 and process fluid is allowed to flow through the first process fluid aperture 214 uninhibited and a second or closed position where the gate 122 blocks the first process fluid aperture 214 and process fluid is substantially inhibited from flowing through the first process fluid aperture 214. In the second position, the gate 122 forms an effective seal with the gate sealing surface 354 on the primary seal 190. The gate 122 moves between the open position and the closed position along the gate axis 130 and within a gate path defined along the gate axis 130.

As shown in FIGS. 1 and 2, the actuator 134 is coupled to the actuator coupling plate 150 and the coupler shaft 154. The actuator coupling plate 150 is attached to the fastening rods 146. Each of the fastening rods 146 are inserted into the corresponding actuator mounting apertures 238 and are then tightened to join the actuation system 114 to the valve body assembly 118. The gate 122 is then coupled to the coupler shaft 154 with the gate coupling 158. Each of the actuator mount lockout apertures 162 are coupled to the fastening rods 146 (e.g., by welding) and are arranged so that the lockout keys 166 can be inserted through two corresponding actuator mount lockout apertures 162 substantially parallel to the first process fluid flow axis 218.

FIG. 12 illustrates in further detail the port gate supports 226 and their arrangement in the valve body assembly 118. During operation, the process fluid imparts a differential pressure across the gate 122 of the gate valve 110 when the gate 122 is in the closed position. The differential pressure across the gate 122 causes the gate 122 to deflect away from the gate axis 130. In one embodiment, when the gate 122 deflects it contacts the port gate supports 226 and the port gate supports 226 constrain the deflection so that the gate 122 is maintained along the gate axis 130 and within the gate path for the entire travel length of the gate 122. The general frustoconical shape of the port gate supports 226 gradually increases in cross sectional area from the inner profile 302 to the outer profile 294, reducing the wear from the process fluid during operation when the gate 122 is in the first position. The port gate supports 226 are also arranged on both the first body half 206 and the second body half 206', resulting in the total occlusion of the process fluid from the port gate supports 226 gradually increasing and then gradually decreasing, further reducing wear from the process fluid during operation when the gate 122 is in the open position.

FIG. 13 illustrates in further detail the chest gate supports 178 and their arrangement in the valve body assembly 118. The chest gate supports 178 are press fit into the chest gate support recesses 274, 274' in the chest portions 266, 266' of the first and second body halves 206, 206'. In other embodiments, the chest gate supports 178 are maintained in the chest gate support recesses 274, 274' by other mechanical arrangements such as an adhesive. Similar to the port gate supports 226, the chest gate supports 178 constrain the deflection of the gate 122 during operation when the gate 122 is in the closed position, and also when the gate 122 is between the open and closed positions.

In one embodiment, the chest gate supports 178 constrain the deflection so that the gate 122 is maintained along the gate axis 130 and within the gate path for the entire travel length of the gate 122. The chest gate supports 178 also substantially eliminate contact between the gate 122 and the first and second body halves 206, 206' during actuation of the gate 122. During actuation of the gate 122, the process fluid imparts a differential pressure, as described above, across the gate 122, while the gate 122 is moving between the open and closed positions, causing the gate 122 to deflect. This deflection causes the gate 122 to come into sliding contact with the chest gate supports 178. To reduce wear on the gate 122 and chest gate supports 178 resulting from this sliding contact, the chest gate supports 178 are made of a non-abrasive and wear resistant.

FIG. 14 illustrates in further detail the primary seal 190 and its arrangement in the valve body assembly 118. The primary seal 190 is arranged between the first body half 206 and the second body half 206', within the primary seal recesses 262, 262'. The primary body width 362 is wider than a primary body space 382 between the primary body recesses 286, 286' when the valve body assembly 118 is assembled. The primary flange width 350 is also wider than a flange body width 386 between the primary flange recesses 282, 282' when the valve body assembly 118 is assembled. As the fastening elements 174 are tightened, the first and second body halves 206, 206' compress the primary seal 190. During operation, this compression provides an effective seal between the first and second body halves 206, 206'. The cutouts 358 allow the primary body portion 330 to undergo a slight shape change. This shape change allows for the gate sealing surface 354 to wrap slightly around the gate 122 in the closed position, providing a secure and effective seal between the gate 122 and the gate sealing surface 354.

Figure 15:
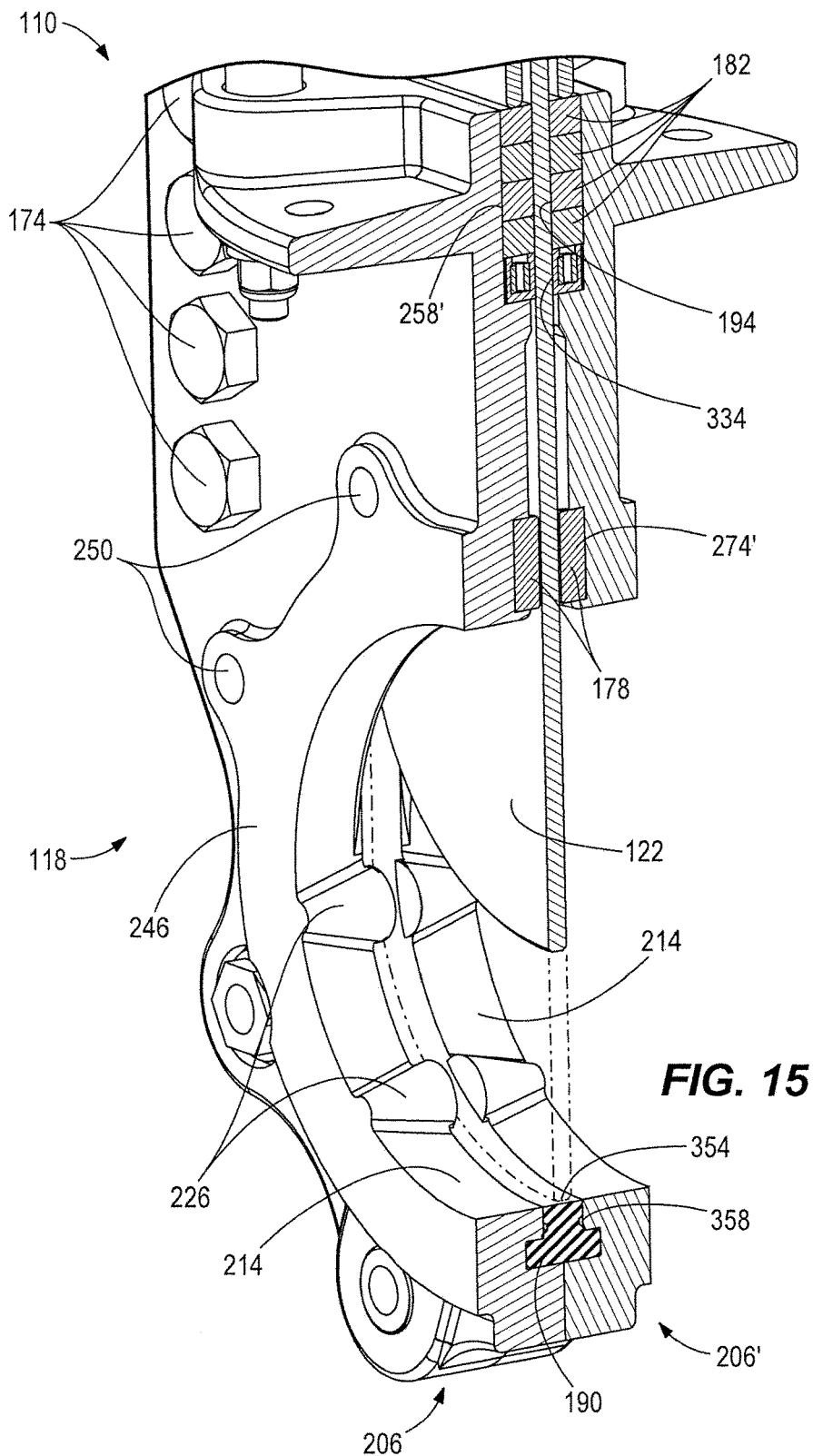
FIG. 15 is a perspective sectional view of the gate valve of FIG. 1 taken along the line 11-11 of FIG. 1.

FIG. 15 illustrates the operation of the gate 122 in the valve body assembly 118. The actuation system 114 actuates the gate 122 between the open position and the closed position to control a flow of process fluid. In both the open and closed positions, the gate 122 contacts the upper gate aperture 334 creating an effective seal between the upper gate aperture 334 on the primary seal 190 and the gate 122. In the closed position, the gate 122 also contacts the gate sealing surface 354 on the primary seal 190. The primary seal 190 is compressed by the first and second body halves 206, 206'. The gate 122 further compresses the primary seal 190, and the cutouts 358 allow the gate sealing surface 354 on the primary seal 190 to wrap slightly around the gate 122, creating an effective seal between the gate 122 and the gate sealing surface 354. In the closed position, the first process fluid aperture 214 is completely blocked by the gate 122, and process fluid is substantially inhibited from flowing through the first process fluid aperture 214.

Figure 16:
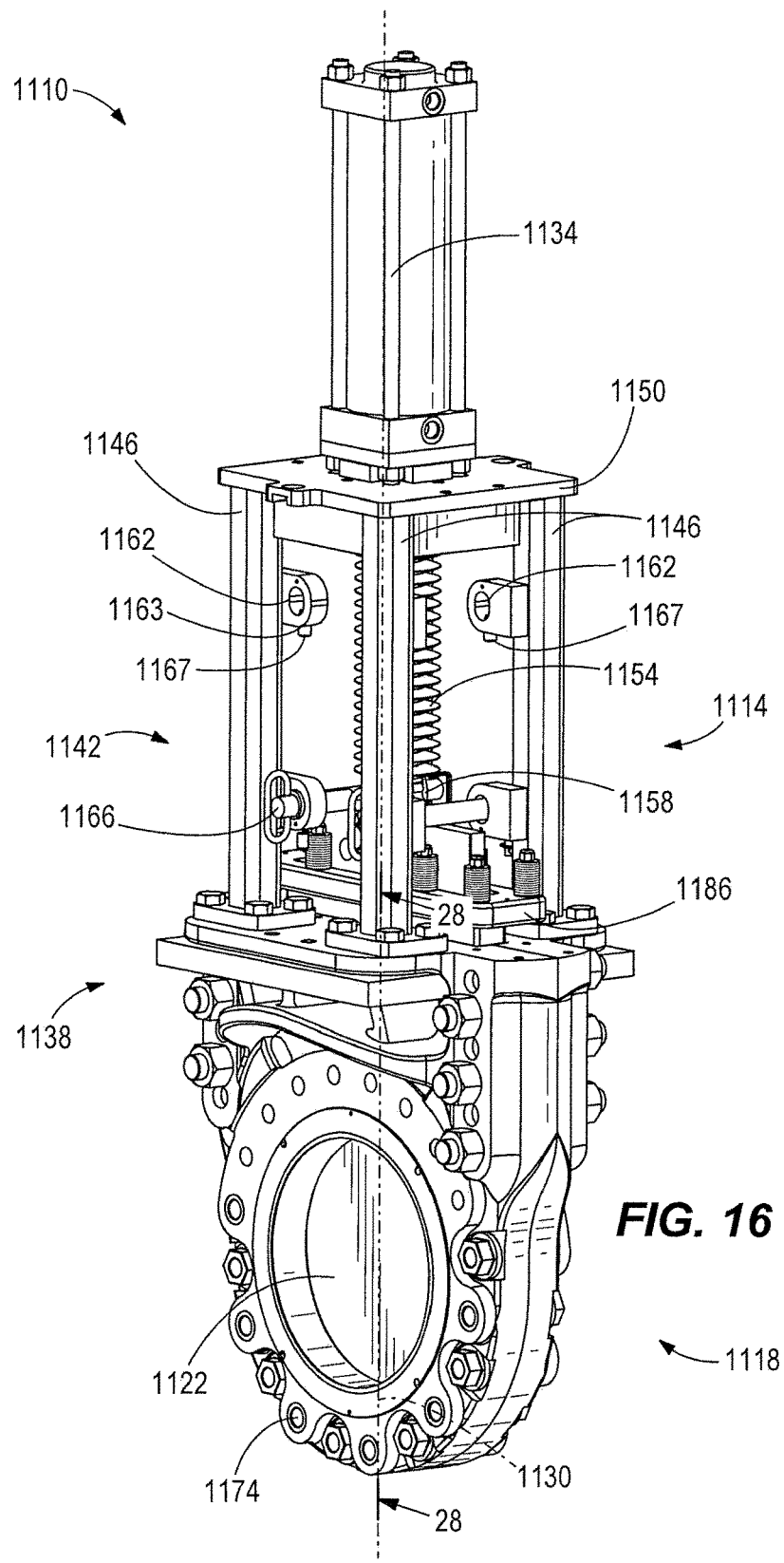
FIG. 16 is a perspective view of a gate valve according to another embodiment of the invention.

FIG. 16 shows a gate valve 1110 according to another embodiment. The gate valve 1110 includes an actuation system 1114, a valve body assembly 1118, and a gate 1122. The gate 1122 defines a gate axis 1130. The actuation system 1114 includes an actuator 1134 in communication with a control system (not shown), an actuator mount 1138 that couples the actuation system 1114 to the valve body assembly 1118, and a lockout system 1142. The actuator mount 1138 includes fastening rods 1146, an actuator coupling plate 1150, a coupler shaft 1154, and a gate coupling 1158 for joining the coupler shaft 1154 and the gate 1122.

The lockout system 1142 includes actuator mount lockout apertures 1162, lockout keys 1166, and an adjustment feature in the form of lockout jacking bolts 1167. Each of the actuator mount lockout apertures 1162 includes a jacking bolt aperture 1163. In the illustrated embodiment, there are two lockout keys 1166. In other embodiments, there could be more or less than two lockout keys 1166. In the illustrated embodiment, there are eight actuator mount lockout apertures 1162. In other embodiments, there could be more or less than eight actuator mount lockout apertures 1162.

Figure 17:
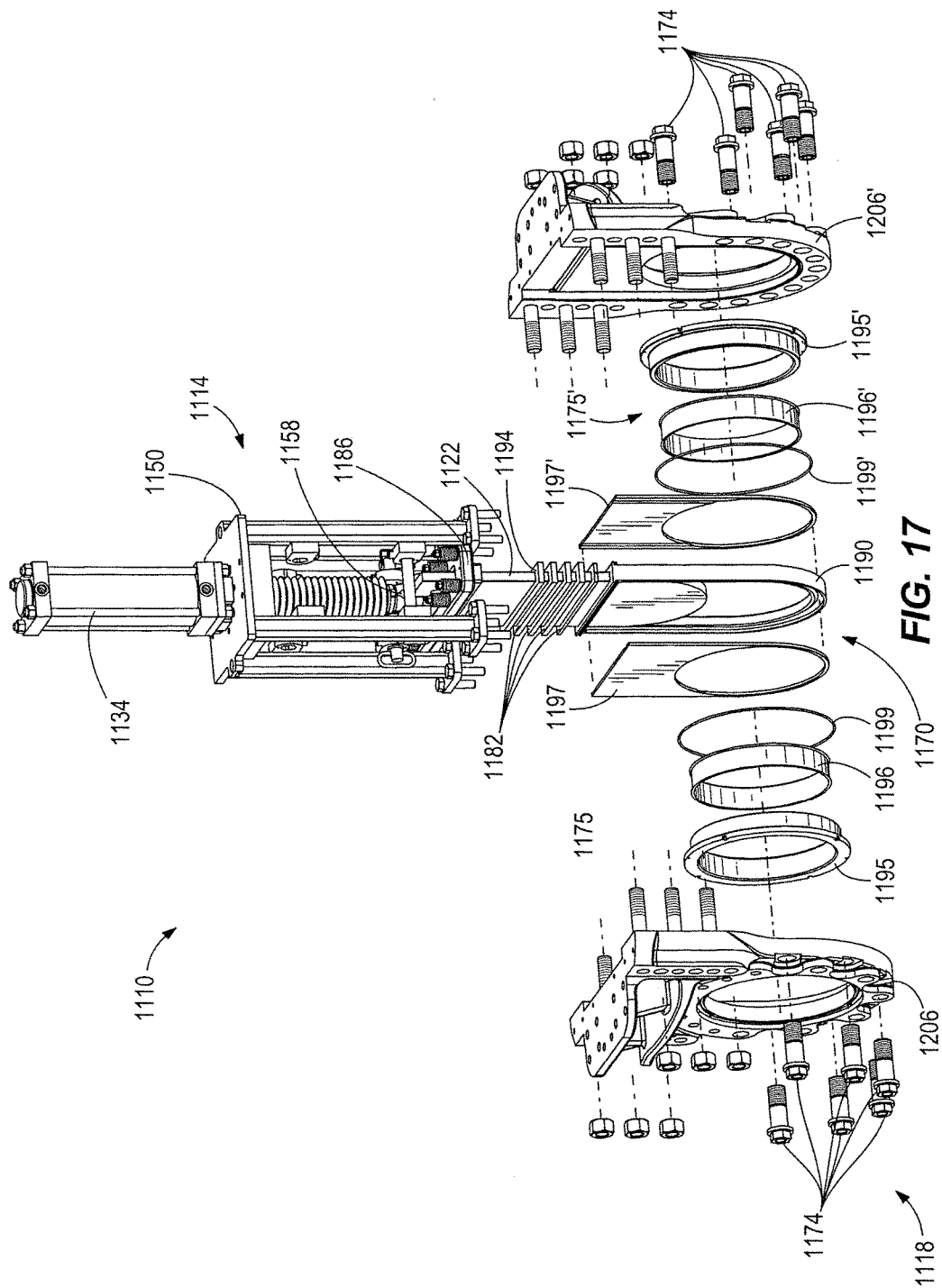
FIG. 17 is an exploded perspective view of the gate valve of FIG. 16.

FIG. 17 shows an exploded view of the gate valve 1110 including the actuation system 1114, the valve body assembly 1118, a sealing system 1170, fastening elements 1174, and flow ring systems 1175, 1175' are clearly visible. The sealing system 1170 includes the gate 1122, the gate coupling 1158, packing material 1182, a packing gland 1186, and a primary seal 1190. In the illustrated embodiment, there are five layers of packing material 1182. In other embodiments, there could be more or less than five layers of packing material 1182. Each of the packing material 1182 includes a packing material aperture 1194. One flow ring system 1175 is discussed below. The other flow ring system 1175' includes the same features and is referenced with prime numbers in the drawings. The flow ring system 1175 includes an external flow ring 1195, a liner 1196, an internal ring or sealing plate 1197, and a sealing ring 1199.

The valve body assembly 1118 includes a first body half 1206 and a second body half 1206'. The first and second body halves 1206, 1206' are symmetric, and the following description of the first body half 1206 also applies to the second body half 1206', with like parts on the second body half 1206' numbered in the prime series.

Figure 18:
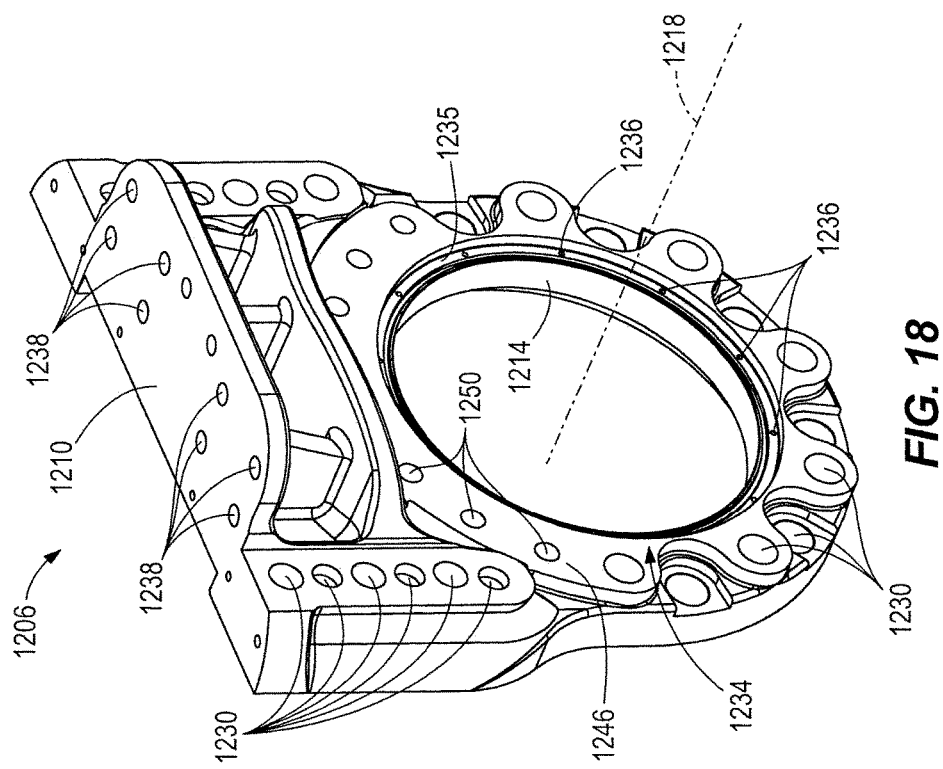
FIG. 18 is a top front perspective view of a first body half of the gate valve of FIG. 16.

As shown in FIG. 18, the first body half 1206 includes an actuator mounting flange 1210, a first process fluid aperture 1214 defining a first process fluid flow axis 1218, body mounting apertures 1230 arranged both parallel to the first process fluid flow axis 1218 and radially around the first process fluid aperture 1214, and a plumbing flange 1234. The actuator mounting flange 1210 includes actuator mounting apertures 1238. The plumbing flange 1234 includes an external ring mounting recess 1235, which includes external ring mounting apertures 1236, and defines a plumbing flange surface 1246. The plumbing flange surface 1246 includes flange apertures 1250 arranged radially around the plumbing flange surface 1246, that enable the first body half 1206 to couple to a pipe (not shown) through which the process fluid flows.

Figure 19:
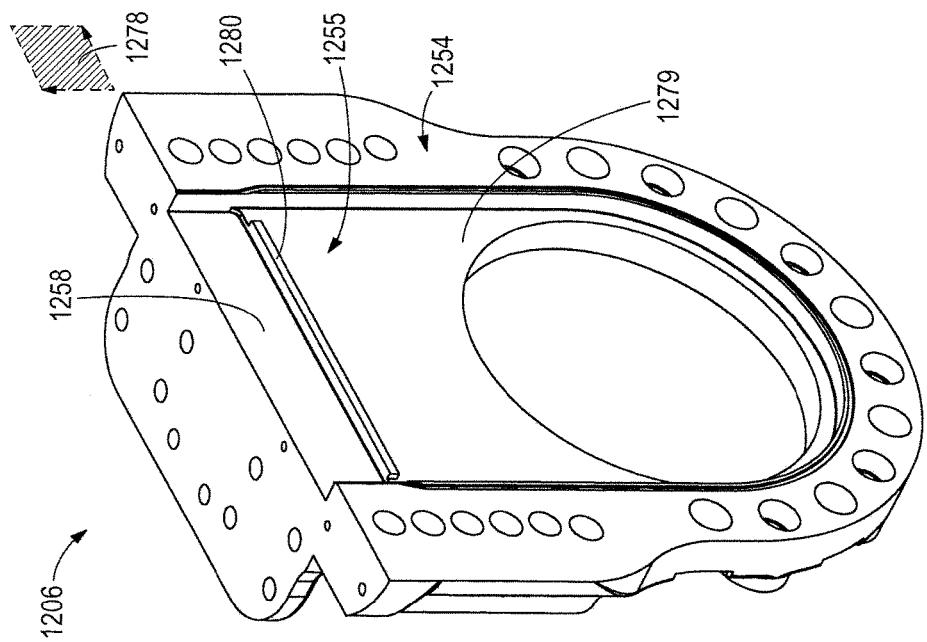
FIG. 19 is a top back perspective view of the first body half of FIG. 18.

As shown in FIG. 19, the first body half 1206 further includes a non-recessed portion 1254, a primary recessed portion 1255, and a packing recess 1258. The non-recessed portion 1254 of the first body half 1206 defines a center plane 1278. The primary recessed portion 1255 is recessed into the first body half 1206 extending away from the center plane 1278, defines a primary recess plane 1279, and includes a sealer projection 1280. The sealer projection 1280 protrudes away from the primary recess plane 1279 toward the center plane 1278. The packing recess 1258 is recessed into the primary recessed portion 1255, extending away from the center plane 1278.

Figure 21:
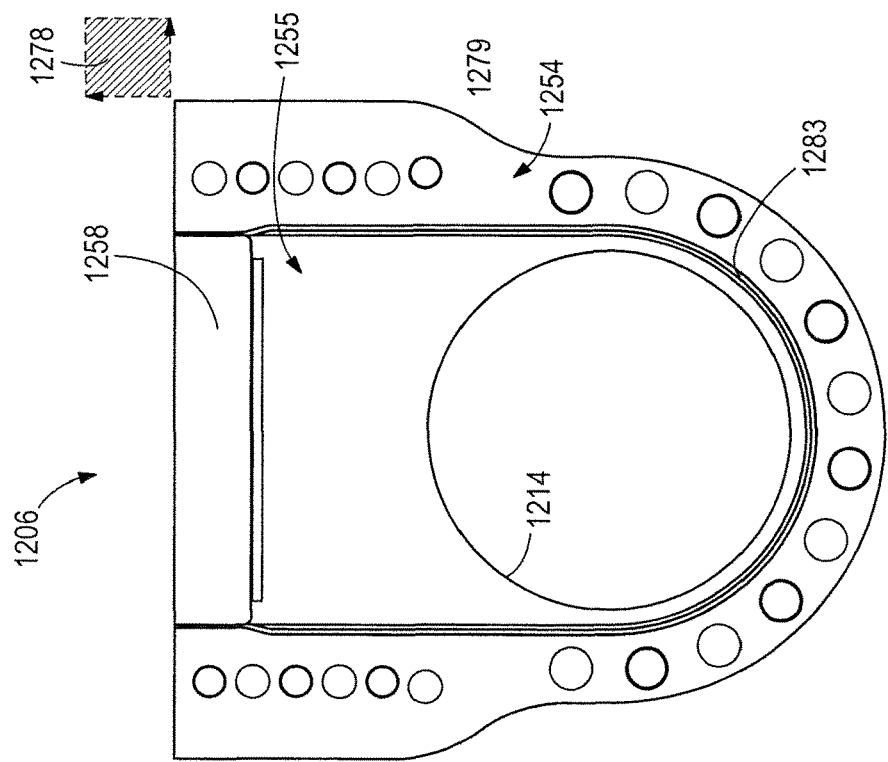
FIG. 21 is an elevational back view of the first body half of FIG. 18.
Figure 20:
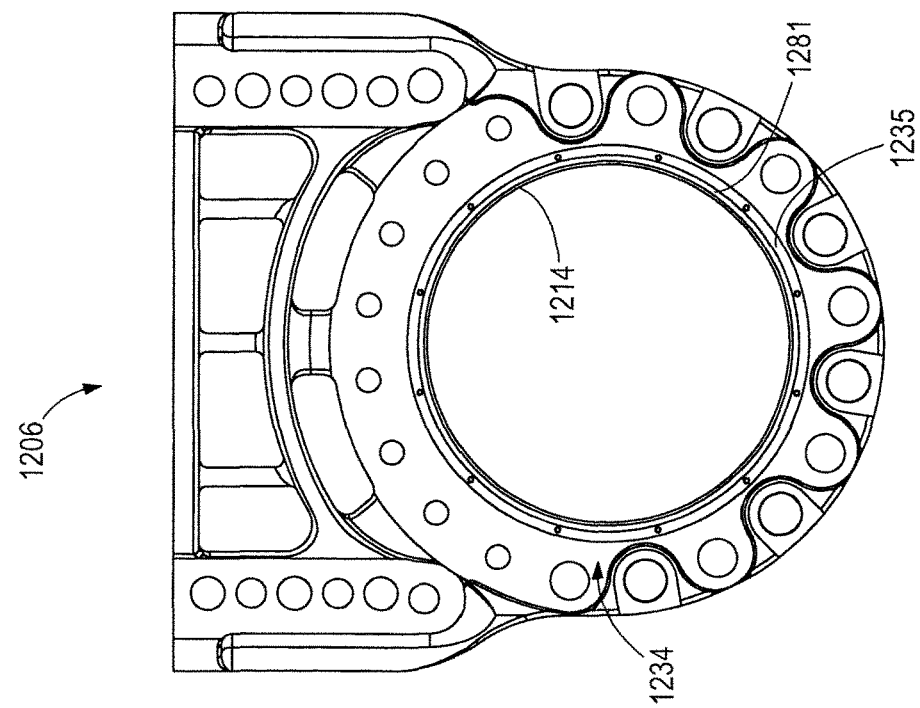
FIG. 20 is an elevational front view of the first body half of FIG. 18.

As shown in FIGS. 20 and 21, the first body half 1206 further includes a sealing ring recess 1281 and a center seal recess 1283. The sealing ring recess 1281 extends around the first process fluid aperture 1214 and is further recessed into the external ring mounting recess 1235 on the plumbing flange 1234. The center seal recess 1283 is recessed into the non-recessed portion 1254, away from the center plane 1278, and extends around the primary recessed portion 1255, terminating where the primary recessed portion 1255 meets the packing recess 1258.

Figure 23:
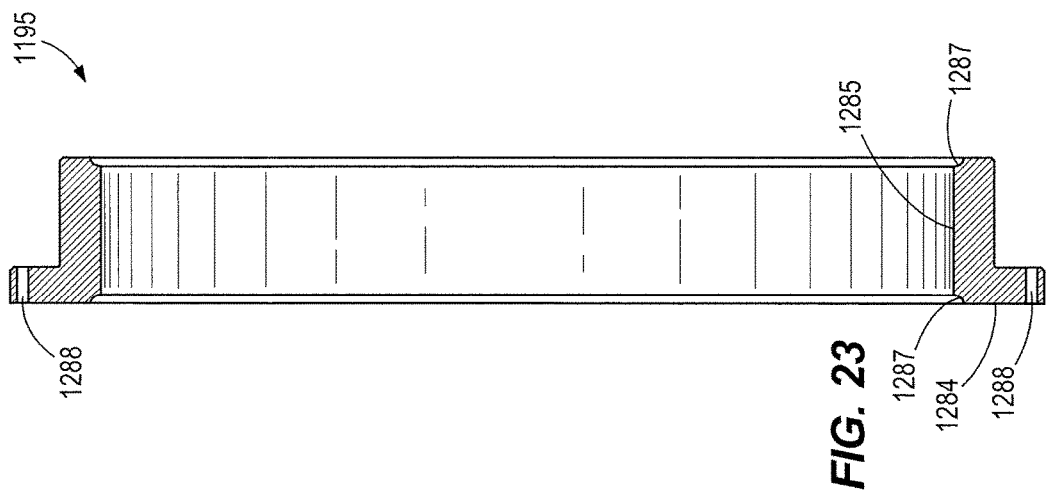
FIG. 23 is a sectional view of the flow ring of FIG. 22 taken along line 23-23 of FIG. 22.
Figure 22:
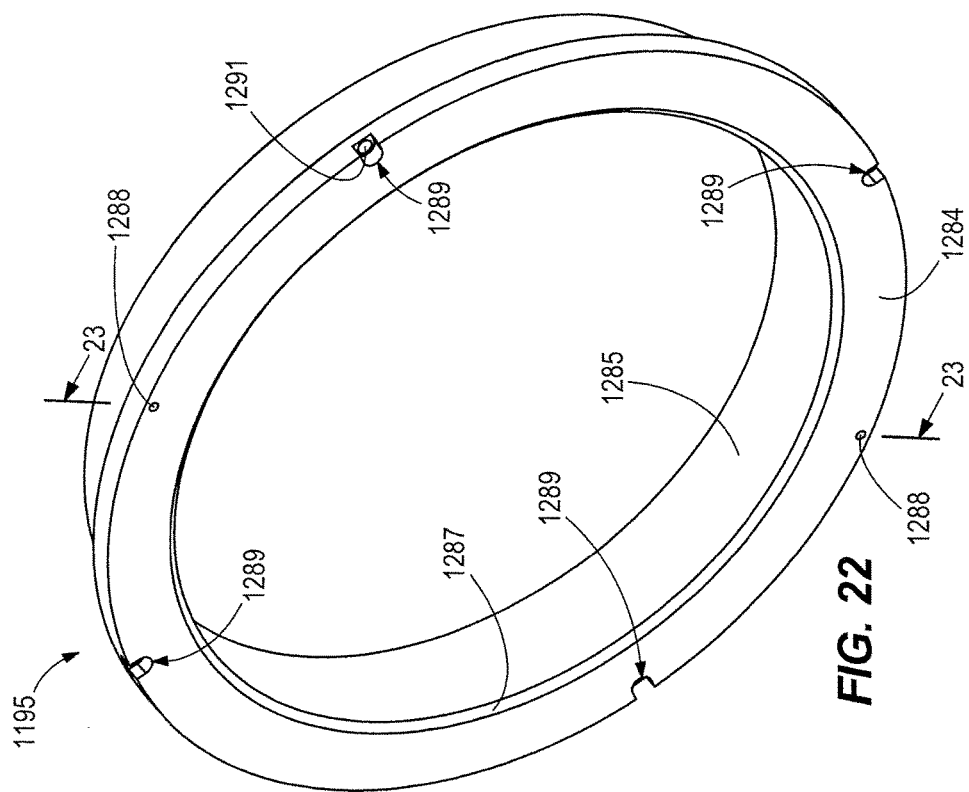
FIG. 22 is a perspective view of a flow ring of the gate valve of FIG. 16.

As shown in FIGS. 22 and 23, the external flow ring 1195 includes an external surface 1284, a mating surface 1285, and mating chamfers 1287. The external surface 1284 includes external surface apertures 1288 and flow ring mounting aperture recesses 1289. Each flow ring mounting aperture recess 1289 includes a flow ring mounting aperture 1291 (one is visible in FIG. 22).

As shown in FIGS. 24 and 25, each of the sealing plates 1197, 1197' include a sealing plate body mating surface 1292, a sealing plate gate mating surface 1293, narrow channels 1295 and a sealing plate process fluid aperture 1296. Each of the sealing plates 1197 are configured to be received within the primary recessed portion 1255 of the first and second body halves 1206, 1206' between the respective first process fluid aperture 1214 and the sealer projection 1280.

As shown in FIGS. 26 and 27, the primary seal 1190 includes an upper gland portion 1322, a primary flange portion 1326, and a primary body portion 1330. The upper gland portion 1322 includes an upper gate aperture 1334, an upper stiffener plate 1335, an upper surface 1338, and an upper flange portion 1342. The upper gate aperture 1334 defines a substantially rectangular shape to conform to the geometry of the gate 1122. In other embodiments, the upper gate aperture 1334 can define another shape to conform to another geometry of a different gate.

As shown in FIG. 27, the primary flange portion 1326 defines a primary flange width 1350. The primary body portion 1330 includes a gate sealing surface 1354, a reinforcing substrate 1355, cutouts 1358, and defines a primary body width 1362. The gate sealing surface 1354 is configured to receive the gate 1122. According to one embodiment, the gate sealing surface 1354 has chamfered edges 1363. In other embodiments, the gate sealing surface 1354 can have rounded or square edges. Each cutout 1358 defines a substantially trapezoidal shape and a cutout depth 1364. Each cutout 1358 extends around the primary seal 1190 (as shown in FIG. 26).

Figures 28, 29:
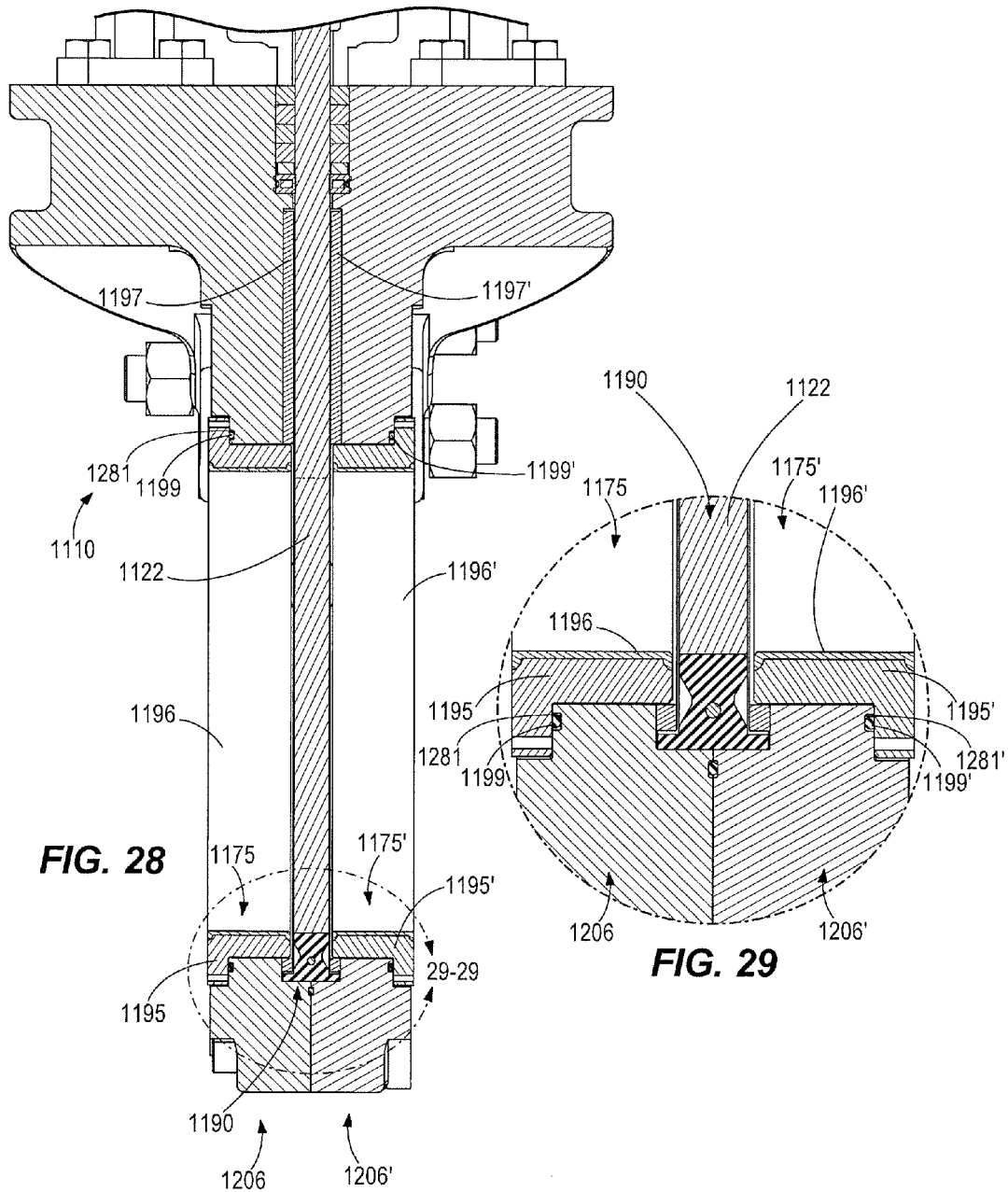
FIG. 28 is a section view of the gate valve of FIG. 16 taken along the line 28-28 of FIG. 16.
FIG. 29 is a detail view of the gate valve of FIG. 16 taken within the line 29-29 of FIG. 28.

As shown in FIG. 28, the gate valve 1110 is assembled by installing a flow ring system 1175, 1175' in each of the first body half 1206 and the second body half 1206'. One flow ring system 1175 installation is discussed below; the second flow ring system 1175' is installed in a similar manner. The sealing ring 1199 is placed into the corresponding sealing ring recess 1281, and the external flow ring 1195 is inserted and fastened to the external ring mounting apertures 1236 (not pictured in FIG. 28). With the external flow ring 1195 installed, the liner 1196 is fitted over the external flow ring 1195 to provide a sealed surface. The primary seal 1190 is then inserted and the sealing plates 1197 are installed, and the two body halves 1206, 1206' are fastened together. The gate 1122 and the rest of the gate valve 1110 are then assembled and operated similar to gate valve 110 discussed above.

The flow ring system 1175 allows passage of material through the inlet and/or outlet and improves the valve 1110 construction methods by combining features for external flow ring 1195 and sealing plate 1197 replacement, external flow ring 1195 axial rotation, transfer of axial loads from the gate 1122 to the valve body halves 1206, 1206', and elimination of pressure boundary requirements for the external flow ring 1195. These features improve service life and reduce maintenance needs. The flow ring system 1175 meets the requirements of the gate valve 1100 (e.g., compliant to MSS-SP-135 and ASME B16.34). The internal ring in the form of the sealing plate 1197 and the external flow ring 1195 are replaceable if they become damaged or excessively worn during service. During valve 1110 service or maintenance, portions of the flow ring system 1175 may develop signs of wear as materials are passed through, especially when corrosive or high-abrasion materials are used. Typically, locations of wear are in the bottom portions of the flow ring system 1175. Longevity of the flow ring system 1175 is extended via axial rotation, allowing worn portions to be relocated to the side or top extents of the process fluid aperture 1214. The flow ring system 1175 also provides for axial loads from the gate 1122 to be absorbed by the internal ring 1197 then onto the body halves 1206, 1206', making the valve 1100 eligible for use in dead-end service when sealing is allowed when the gate 1122 is in the closed position while pipe flanges are absent or disconnected. The flow ring system 1175 is not configured as part of a connected pipe flange, and the pipe flange is no longer utilized as a valve component with a restraining surface that maintains a pressure differential. In another embodiment, the flow ring system 1175 can include an internal ring 1197 that is fastened to an inner portion of each body half 1206, 1206' in a manner similar to the external flow ring 1195. The second flow ring system 1175' provides the same advantages as the first flow ring system 1175 discussed above.

Figure 31:
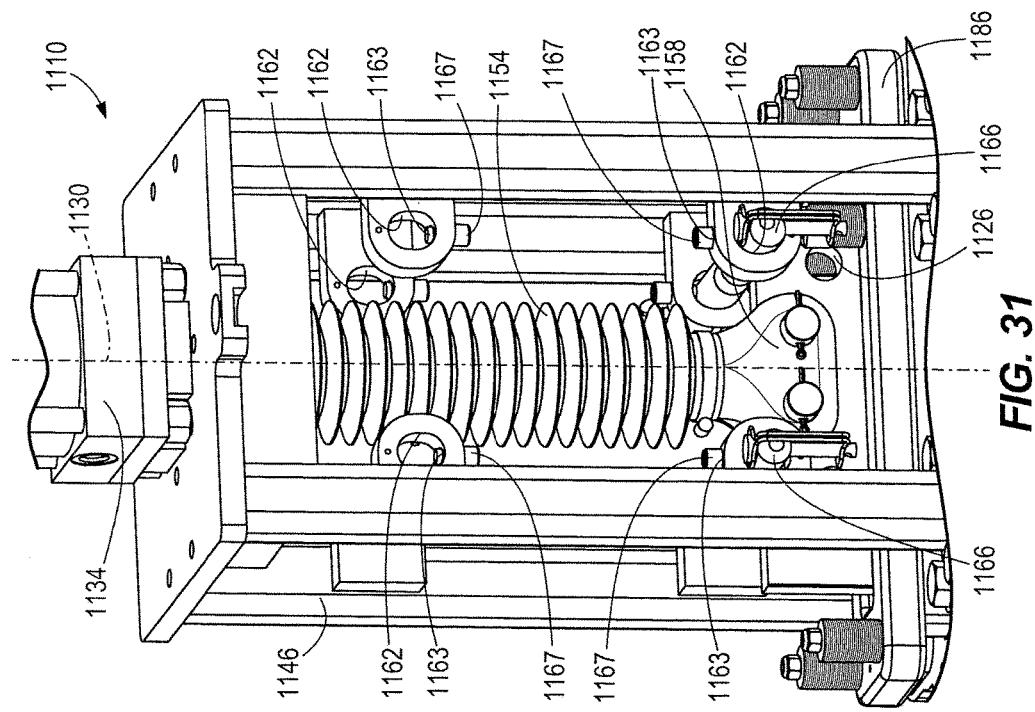
FIG. 31 is a perspective view of a jacking assembly of the gate valve of FIG. 16.
Figure 30:
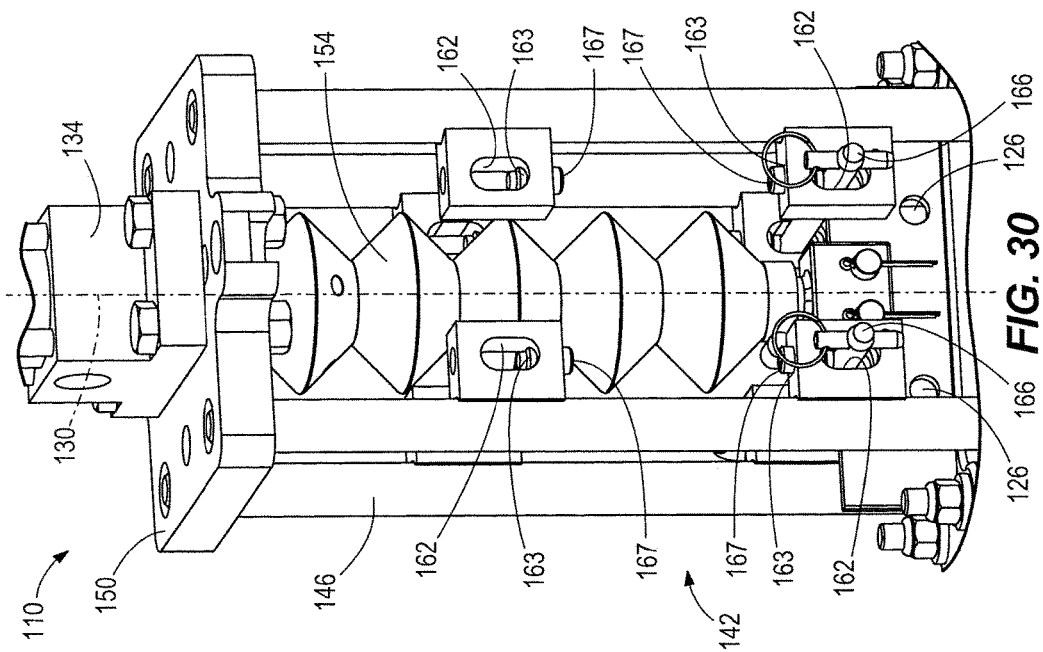
FIG. 30 is a perspective view of a jacking assembly of the gate valve of FIG. 1.

FIGS. 30 and 31 illustrate operation of the lockout systems 142, 1142 of the gate valve 110 and the gate valve 1110, respectively. Lockout apertures 162, 1162 are generally aligned with the gate locking apertures 126, 1126 of gate 122, 1122 along gate axis 130, 1130. Lockout jacking bolts 167, 1167 are threadably engaged with jacking apertures 163, 1163 and are used to adjust the position of engagement with lockout keys 166, 1166. The inclusion of the jacking bolts 167, 1167 allows the lockout apertures 162, 1162 to be installed during assembly of the gate valve 110, 1110. The lockout apertures 162, 1162 do not need to be as exactly placed as prior art lockout apertures because the jacking bolts 167, 1167 are adjusted in the field to match the lockout positions of the gate 122, 1122 in place. In other words, the jacking bolts 167, 1167 can be adjusted (e.g., threaded in or out of the jacking apertures 163, 1163) to take up slack in the lockout system 142, 1142. The ability to install (e.g., weld) the lockout apertures 162, 1162 in a factory or assembly line setting and later adjust the jacking bolts 167, 1167 in the field greatly improves ease of installation and functionality.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Particularly, portions or components of the gate valve 110 may be combined with any portions or components of the gate valve 1110 described above. The entire disclosure of each patent and publication cited herein is incorporated by reference, as if each such patent or publication were individually incorporated by reference herein.

Various features and advantages of the invention are set forth in the following claims.

The invention claimed is:

1. A gate valve comprising:
   a first body half defining a first process fluid aperture, a first chest portion, and a first gate support recess formed in the first chest portion;
   a second body half defining a second process fluid aperture aligned with the first process fluid aperture, a second chest portion, and a second gate support recess formed in the second chest portion;

a gate movable relative to the first body half and the second body half; and a gasket seal including a flange portion having a first width, a body portion having a second width formed between first and second surfaces, the second width being less than the first width, and a first cutout and a second cutout being formed in the first and second surfaces, respectively, the flange portion and the body portion sized to be compressed between the first body half and the second body half, and the cutouts providing for volume transformation of the gasket seal under compression;

the first body half defining a first flange recess and the second body half defining a second flange recess;

a flange body width being defined between the first flange recess and the second flange recess; and a flange width of the flange portion of the gasket seal being wider than the flame body width.

2. The gate valve of claim 1, wherein the first body half and the second body half each define a body recess, a primary body width is defined by the body recesses of the first body half and the second body half, and a body width of the body portion of the gasket seal is wider than the primary body width.

3. The gate valve of claim 1, wherein the cutouts define a substantially trapezoidal shape.

4. The gate valve of claim 1, wherein the cutouts define a cutout depth that is between about five and about twenty percent of a body width of the body portion.

5. The gate valve of claim 1, wherein the at least one of the first and second cutouts extends around a periphery of the gasket seal.

6. The gate valve of claim 1, further comprising a replaceable external ring engaged with the first process fluid aperture and at least partially maintaining the gasket seal within the gate valve.

7. The gate valve of claim 1, further comprising a replaceable inner ring engaged with the first body half and configured absorb axial loading of the gate.

8. The gate valve of claim 1, further comprising lockout apertures that include an adjustment feature arranged to align with gate locking apertures formed in the gate.

9. The gate valve of claim 1, further comprising a lockout jacking bolt arranged to adjust a position of a lockout key.

10. The gate valve of claim 1, wherein the gasket seal includes a reinforcing substrate.

11. The gate valve of claim 1, wherein the gasket seal includes chamfers.

12. A sealing assembly for a gate valve with a body that includes a process fluid aperture, the sealing assembly comprising:

a primary seal recess formed in the body of the gate valve, the primary seal recess being in communication with the process fluid aperture and including a primary flange width and a primary body width; and a gasket seal including:
a body portion defining a body portion width formed between first and second surfaces, the body portion width being larger than the primary body width;
a flange portion defining a flange portion width larger than the primary flange width and larger than the body portion width; and
a cutout arranged in one of the first and second surfaces to provide volume transformation under compression; and a replaceable external ring engaged with the process fluid aperture and at least partially maintaining the gasket seal within the gate valve.

13. The sealing assembly of claim 12, wherein the cutout is trapezoidal in shape and extends around a periphery of the gasket seal.

14. The sealing assembly of claim 12, wherein the gasket seal further includes an upper gland portion that defines a gate aperture.

15. The sealing assembly of claim 12, wherein the cutout defines a cutout depth that is between five and twenty percent of the body portion width.

16. A seal for a gate valve with a gate, the seal comprising:
a body portion having first and second opposing surfaces, a body portion width formed between the first and second opposing surfaces, and a gate sealing surface extending between the first and second opposing surfaces;
a flange portion defining a flange portion width, the flange portion width being greater than the body portion width; and
a cutout arranged in one of the first and second opposing surfaces of the body portion to provide volume transformation of the seal when the gate sealing surface is under compression from an end of the gate of the gate valve, while the gate valve is in a closed position, to cause the gate sealing surface to at least partially wrap around the end of the gate.

17. The seal of claim 16, wherein the flange portion defines rounded edges.

18. The seal of claim 16, wherein the gate sealing surface defines a substantially flat surface that extends between the first and second opposing surfaces.

19. The seal of claim 16, wherein the cutout defines a cutout depth that is between five and twenty percent of the body portion width.

* * * * *